(12) United States Patent
Dix

(10) Patent No.: US 7,513,823 B1
(45) Date of Patent: Apr. 7, 2009

(54) LINEAR VAV BOX

(76) Inventor: Dale Amos Dix, 13025 Morris Bridge Rd., Thonotosassa, FL (US) 33592-2437

( * ) Notice: Subject to any disclaimer, the term of this patent is extended or adjusted under 35 U.S.C. 154(b) by 13 days.

(21) Appl. No.: 11/758,689

(22) Filed: Jun. 6, 2007

(51) Int. Cl.
*F24F 13/10* (2006.01)
*F16K 1/22* (2006.01)

(52) U.S. Cl. .................. 454/333; 251/305; 137/601.17

(58) Field of Classification Search ............... 454/254, 454/333; 137/601.17; 251/305
See application file for complete search history.

(56) References Cited

U.S. PATENT DOCUMENTS

| | | | | |
|---|---|---|---|---|
| 2,089,771 | A * | 8/1937 | Swinney | 123/579 |
| 3,283,694 | A * | 11/1966 | Dean, Jr. | 454/267 |
| 3,286,732 | A * | 11/1966 | Alley | 137/601.11 |
| 4,095,534 | A * | 6/1978 | Goidich | 110/263 |
| 6,328,281 | B1 * | 12/2001 | Jung | 251/305 |
| 6,352,241 | B1 * | 3/2002 | Hannewald et al. | 251/129.11 |
| 6,698,717 | B1 * | 3/2004 | Brookshire et al. | 251/305 |
| 7,040,283 | B2 * | 5/2006 | Soshino et al. | 123/337 |

\* cited by examiner

*Primary Examiner*—Steven B McAllister
*Assistant Examiner*—Patrick F. O'Reilly, III
(74) *Attorney, Agent, or Firm*—Ronald E. Smith; Smith & Hopen, P.A.

(57) ABSTRACT

A VAV box includes a housing formed by a top wall, a bottom wall, and a pair of vertical side walls. A blade is mounted for rotation about a vertical axis within an air flow passageway defined by a hollow interior of the housing. A first protuberance formed on an interior side of the first side wall has a leading wall swept back relative to an entrance to the box, a trailing wall swept forward relative to the entrance, and a concave wall that interconnects the innermost ends of the leading and trailing walls. A second protuberance having the same structure is formed on an interior side of the second side wall. The protuberances produce a linear response in air flow to changes in blade position, eliminating the non-linear response of prior art VAV boxes.

3 Claims, 4 Drawing Sheets

LINEAR VAV BOX

BACKGROUND OF THE INVENTION

1. Field of the Invention

This invention relates to the field of air flow control. More particularly, it relates to a variable air volume (VAV) box used to control the flow of air by volume through the box and associated ductwork.

2. Description of the Prior Art

VAV boxes are used in air conditioning systems to adjust and control the supply of air to spaces within a building. VAV boxes have therefore essentially one basic function, i.e., to control air volume. Additions to that configuration include positioning coils in the air flow path to moderate air temperature. The basic box is provided in varying sizes depending upon the requirements of the application. A single blade control element having a square or rectangular shape is mounted for rotation to control the volume of air flow through the box.

The walls of a conventional VAV box are made of flat, straight sections of sheet metal that offer no advantage to air control characteristics.

A VAV box is fully closed when its blade or blades are in their respective non-rotated positions, i.e., when each blade has zero degrees (0°) of rotation. A VAV box is fully open when each blade is rotated ninety degrees (90°) relative to its fully closed position. The relation between volume of air flow and blade position in a conventional single blade control element is non-linear.

More particularly, conventional single blade control elements exhibit an increased air flow at the beginning of blade rotation, i.e., as the blade starts to open. For example, a zero to ten degree (0°-10°) of rotation of the blade corresponds to about a thirty percent (30%) increase in air flow. A fifty-five to ninety degree (55°-90°) of rotation corresponds to only a ten percent (10%) increase in air flow.

This non-linear characteristic gives rise to numerous control problems. Air passing through a VAV box and the air space temperature are difficult to control because the relationship of blade position to necessary control parameters are non-linear. Control feedback loop response times are also increased. Pressure downstream of the VAV box becomes variable, and calculation of minimum and maximum air volume to obtain a valid air balance becomes nearly impossible. Historically these problems have been addressed in numerous and unsuccessful ways.

Adjustment of the linkage that connects the actuator to the blade has been tried in various forms. Such adjustment produces a variable "exchange" ratio between the actuator and blade position. Linkage-to-actuator inaccuracies and tolerances lead to "play" in that connection, which is critical, especially in the first stages of opening. A small degree of play in the initial stages of opening has great impact on flow volume characteristics.

Another attempt to produce linear air flow includes programming the output signal to an actuator associated with a particular VAV box. After programming, the output of the actuator becomes non-linear in such a way that it causes air flow through the VAV box to become linear. However, this assumes that the programmer knows the exact characteristics of the specific VAV box in use, and the needs of the space that it serves, which assumption is usually invalid.

These problems have historically made it hard to accurately control air flow through a standard VAV box to achieve an accurate air balance.

However, in view of the art considered as a whole at the time the present invention was made, it was not obvious to those of ordinary skill in this art how the identified needs could be met.

SUMMARY OF INVENTION

This invention discloses a VAV box that more precisely controls the volume of air that flows through it and its associated ducts. This invention is not limited to VAV boxes, but is ideal for use in any place where a more precise adjustment of air volume is needed or advantageous.

The novel VAV box is modified in transverse cross-section by a pair of side wall-mounted protuberances such that the free area between the opposite ends of the blade and the side walls of the VAV box varies differently from that of a standard VAV box as the blade rotates. This difference with the added protuberances causes air flow through said free area to vary in an essentially linear fashion. Fine adjustments of the protuberances by actual air flow testing so that a true linear characteristic is accomplished. The protuberances may be made of any suitable materials including, but not limited to, sheet metal, plastic, fiberglass or composites. The protuberances are scalable, i.e., they may be made to fit VAV boxes of any size.

The primary advantage of this invention is that it provides a VAV box that produces a linear change in air flow in response to changes in blade position, thereby providing the positive, predictable control that evaded prior art control systems.

Another advantage is that the linear response is provided by a change in the mechanical shape of the air flow passageway through the VAV box.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
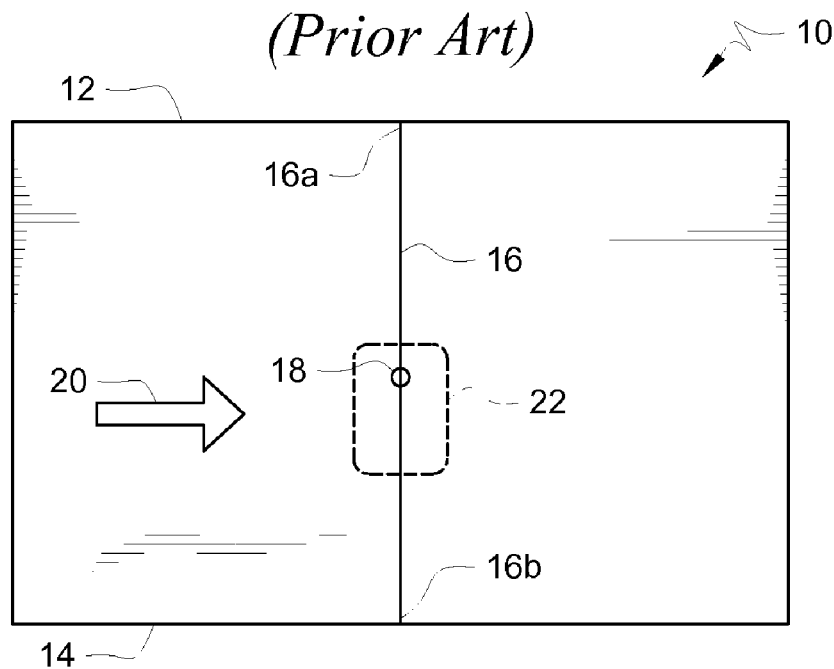
FIG. 1 is a top plan view of a conventional VAV box.

Referring now to FIG. 1, it will there be seen that an illustrative embodiment of the invention is denoted as a whole by the reference numeral 10.

FIG. 1 depicts a conventional VAV box in top plan view. It has a parallelepiped construction that includes a horizontally disposed top wall, a horizontally disposed bottom wall, and a pair of vertically disposed side walls. In FIG. 1, a first side wall is denoted 12 and a second side wall is denoted 14.

Blade 16 is mounted about vertical axis 18 for rotation in a horizontal plane. Blade 16 is in its fully closed position in FIG. 1, i.e., blade 16 is positioned in perpendicular relation to said first and second sidewalls and in perpendicular relation to air flow 20. Opposite ends 16a, 16b of blade 16 are positioned in very close proximity to said first and second sidewalls when blade 16 is in its fully closed position so that substantially no air can flow through said box.

Figure 2:
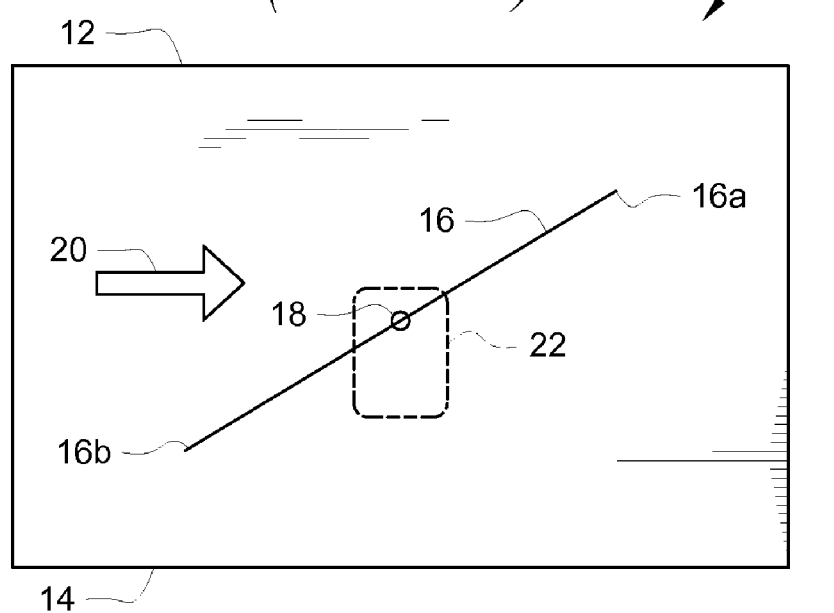
FIG. 2 is a top plan view of a conventional VAV box when its blade is fifty percent (50%) open.

Blade 16 is depicted in a half-open position in FIG. 2. A fully open position is achieved when blade 16 rotates ninety degrees (90°) relative to its FIG. 1 position.

Actuator 22 controls the position of blade 16. More particularly, blade 16 is connected to actuator 22 by an undepicted linkage.

Figure 3:
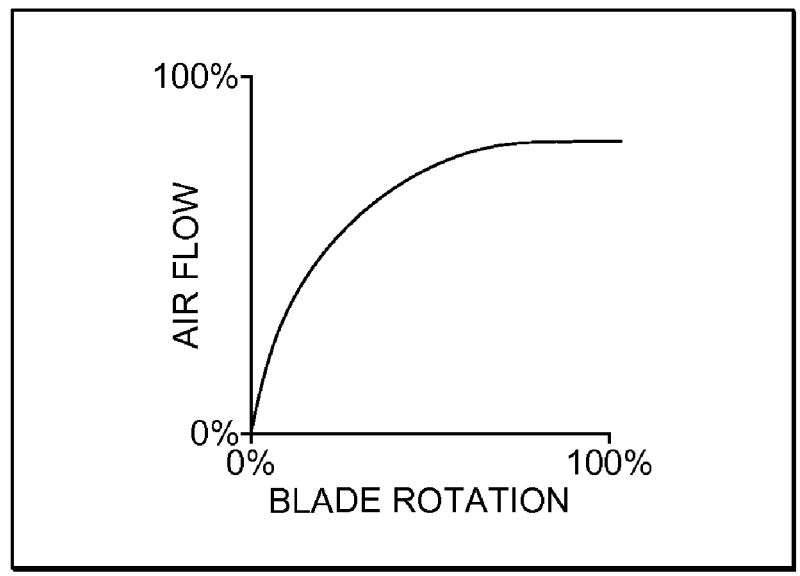
FIG. 3 is a plot of air flow versus blade rotation of a conventional VAV box.

FIG. 3 plots air flow versus percentage of blade rotation of the conventional VAV box of FIGS. 1 and 2. The relationship is clearly non-linear.

Figure 4:
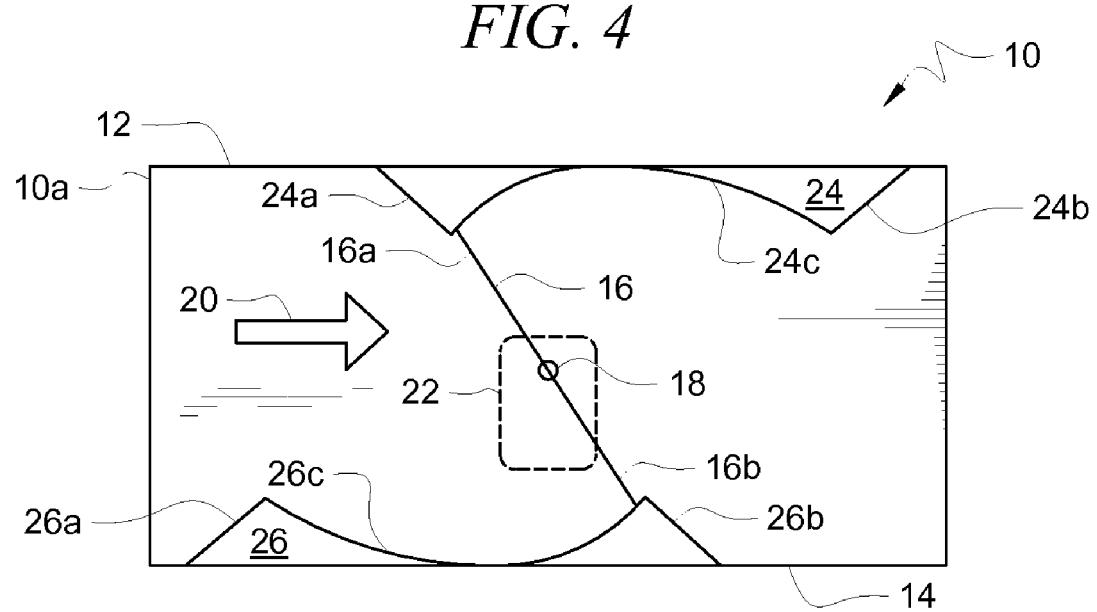
FIG. 4 is a top plan view of the novel VAV box.

FIG. 4 depicts a preferred embodiment of the novel VAV box 10 in top plan view with blade 16 in its closed position. Novel box 10 differs from prior art box 10 because protuberances 24, 26 have been mounted to an interior surface of side walls 12 and 14, respectively. Said protuberances can be built into box 10 at the time of manufacture, or they may be retrofit into a previously manufactured box.

First protuberance 24 has a leading wall 24a that is swept back relative to air flow 20 and a swept forward trailing wall 24b. Leading wall 24a extends into the hollow interior of box 10 to substantially the same extent as trailing wall 24b. Concave wall 24c interconnects the respective innermost ends of said leading and trailing walls. Protuberance 24 extends from the top wall of housing 10 to the bottom wall thereof.

Second protuberance 26 has a leading wall 26a that is swept back relative to air flow 20 and a swept forward trailing wall 26b. Leading wall 26a extends into the hollow interior of box 10 to substantially the same extent as trailing wall 26b. Concave wall 26c interconnects the respective innermost ends of said leading and trailing walls. Protuberance 26 extends from the top wall of housing 10 to the bottom wall thereof.

First protuberance 24 is set back further from entrance 10a of air box 10 than second protuberance 26. More particularly, as clearly depicted in FIGS. 4 and 5, swept back leading wall 24a of first protuberance 24 is in longitudinal alignment with swept forward trailing wall 26b of second protuberance 26. Swept back leading wall 26a of second protuberance 26 is in longitudinal alignment with swept forward trailing wall 24b of first protuberance 24.

Air flow 20 is closed off when opposite ends 16a, 16b of control blade 16 are in close juxtaposition with the respective innermost ends of swept back leading wall 24a of first protuberance 24 and swept forward trailing end 26b of second protuberance 26 as depicted in FIG. 4.

Figure 5:
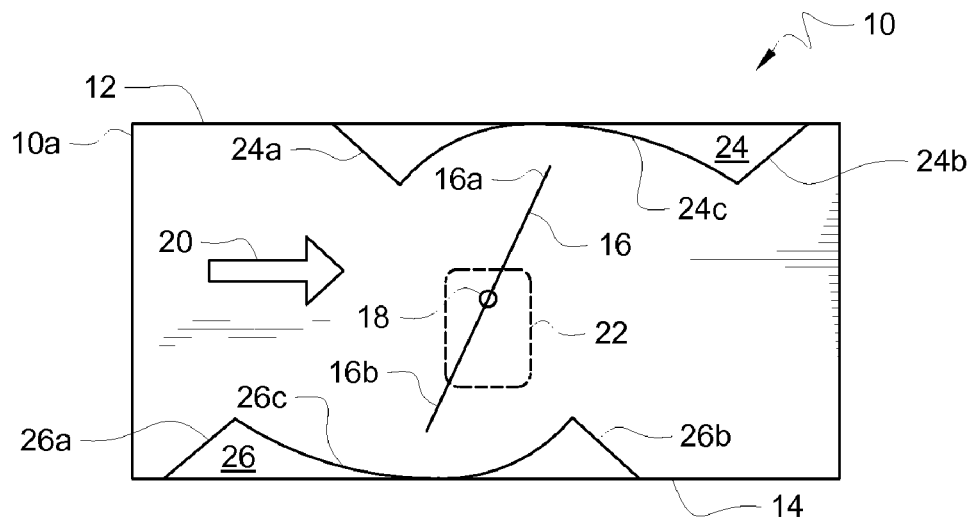
FIG. 5 is a top plan view of the novel VAV box in a fifty percent (50%) or half-open configuration.

FIG. 5 depicts VAV box 10 in top plan view with blade 16 in its half (50%) open position. As blade 16 rotates about pivot point 18, the space between the opposite ends 16a, 16b of said blade 16 and the walls of said protuberances 24, 26 increases. The air flow through the VAV box is therefore increased. More specifically, protuberances 24, 26 are shaped such that as blade 16 rotates, the space between opposite ends 16a, 16b of blade 16 and said protuberances increases as a function of the square root of available opening area. Thus the flow rate through VAV box 10 becomes essentially linear with respect to the degree of rotation of blade 16. In other words, as blade 16 rotates about pivot point 18, opposite ends 16a, 16b move away from concave walls 24c, 26c of the respective protuberances and create free area for air flow. However, this free area increases in such a way that air flow is increased in a linear fashion.

Figure 6:
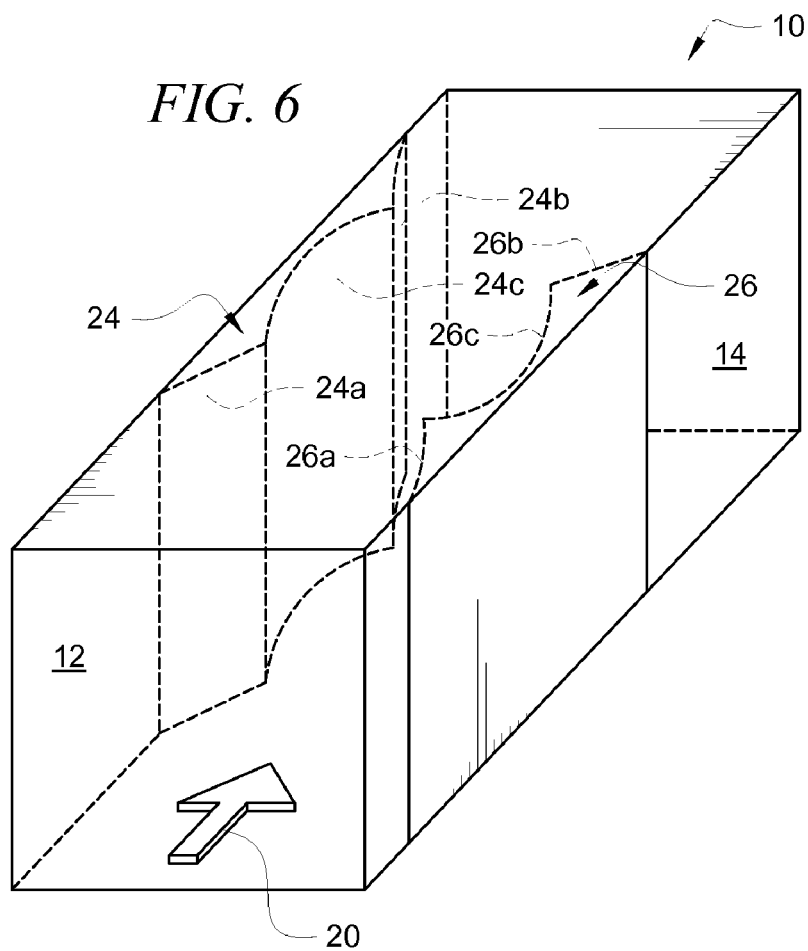
FIG. 6 is a perspective view of the novel VAV box.

FIG. 6 is a perspective view depicting protuberances 24, 26. Blade 16 is not depicted to simplify the drawing.

Figure 7:
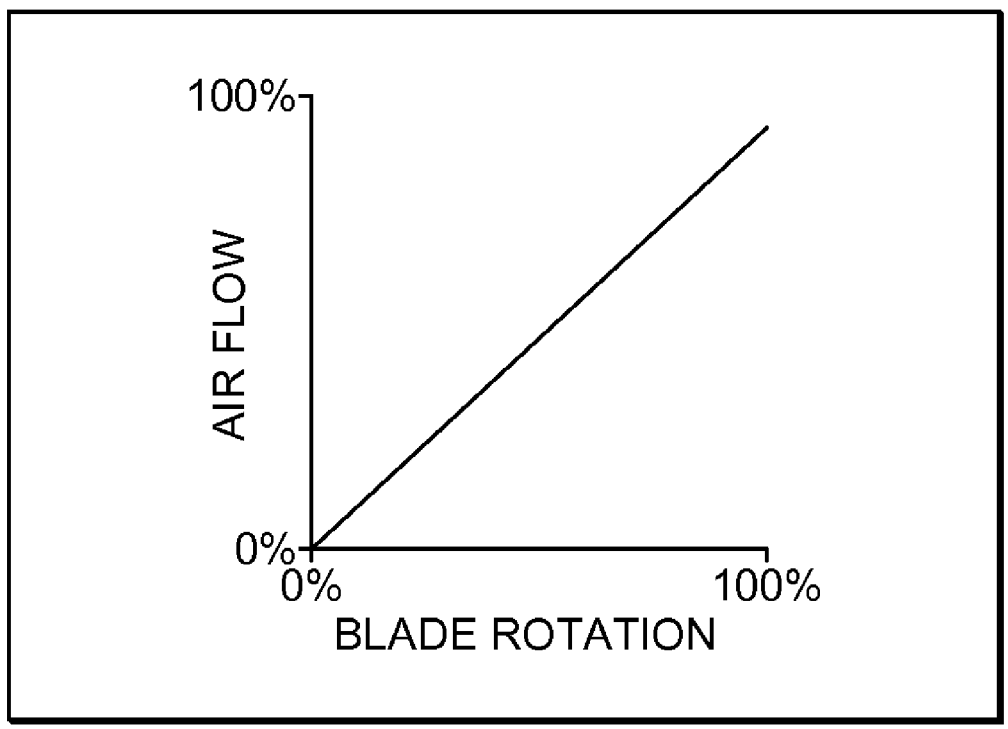
FIG. 7 is a plot of air flow versus blade rotation of the novel VAV box.

FIG. 7 plots air flow versus percentage of blade rotation through the novel VAV box. This plot shows that the relationship is linear as aforesaid.

This invention is not limited to VAV boxes. It may be applicable to any structure having a non-linear air flow therethrough where it is desired to produce a linear air flow.

It will be seen that the advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A VAV box, comprising:

a housing of parallelepiped configuration having a hollow interior formed by a flat top wall, a flat bottom wall, and a pair of flat side walls;

said housing having an entrance at a leading end and an exit at a trailing end so that an airflow enters said housing at said leading end and exits at said trailing end;

said pair of side walls having a vertical orientation and including a first side wall and a second side wall;

an air flow passageway defined by said hollow interior of said housing;

a flat blade mounted within said air flow passageway;

said flat blade mounted on a vertical axis for rotation in a horizontal plane;

a first protuberance formed on an interior side of said first side wall;

said first protuberance having a leading wall that is swept back relative to said entrance to said VAV box and having a trailing wall that is swept forward relative to said entrance;

said first protuberance leading wall extending into said hollow interior of said VAV box by a preselected distance that is substantially equal to a second preselected distance by which said first protuberance trailing wall extends into said hollow interior;

respective innermost ends of said first protuberance leading and trailing walls being interconnected to one another by a concave wall;

a second protuberance formed on an interior side of said second side wall;

said second protuberance having a second protuberance leading wall that is swept back relative to said entrance to said VAV box and having a second protuberance trailing wall that is swept forward relative to said entrance;

said leading wall of said second protuberance extending into said hollow interior of said VAV box by a first preselected distance that is substantially equal to a second preselected distance by which said trailing wall of said second protuberance extends into said hollow interior; and respective innermost ends of said leading and trailing walls of said second protuberance being interconnected to one another by a second concave wall; and wherein the innermost ends of the first and second protuberances are substantially aligned in the direction of airflow.

2. The VAV box of claim 1, further comprising:

said second protuberance being mounted closer to said leading end of said VAV box than said first protuberance;

said swept back leading wall of said first protuberance being oriented parallel to said swept forward trailing wall of said second protuberance in a longitudinal direction; and said swept back leading wall of said second protuberance being oriented parallel to said swept forward trailing wall of said first protuberance in a longitudinal direction.

3. The VAV box of claim 2, further comprising:

said first and second protuberances extending from said top wall to said bottom wall of said housing.

\* \* \* \* \*